United States Patent
Vo et al.

(10) Patent No.: US 7,327,943 B2
(45) Date of Patent: Feb. 5, 2008

(54) INSTALLATION CLOSURE HAVING FIBER MANAGEMENT APPARATUS

(75) Inventors: Chanh C. Vo, Keller, TX (US);
Anthony R. Board, Keller, TX (US);
Guy Castonguay, Ft. Worth, TX (US);
Brad N. Grunwald, Euless, TX (US);
James O. Little, Bowie, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/165,457

(22) Filed: Jun. 22, 2005

(65) Prior Publication Data
US 2006/0291792 A1     Dec. 28, 2006

(51) Int. Cl.
*G02B 6/44* (2006.01)

(52) U.S. Cl. .......................... 386/100; 385/99; 385/134; 385/136; 385/137

(58) Field of Classification Search .................. 385/99, 385/86, 87, 134, 135, 136, 137, 100
See application file for complete search history.

(56) References Cited

U.S. PATENT DOCUMENTS

| | | | |
|---|---|---|---|
| 4,820,007 A * | 4/1989 | Ross et al. .................. 385/135 |
| 5,042,901 A | 8/1991 | Merriken et al. ........... 385/135 |
| 5,363,465 A * | 11/1994 | Korkowski et al. ......... 385/135 |
| 5,381,501 A * | 1/1995 | Cardinal et al. .............. 385/54 |
| 5,644,671 A * | 7/1997 | Goetter et al. .............. 385/135 |
| 5,892,870 A | 4/1999 | Fingler et al. ................ 385/59 |
| 6,014,490 A * | 1/2000 | Canning et al. ............. 385/135 |
| 6,466,725 B2 | 10/2002 | Battey et al. ............... 385/135 |
| 6,493,501 B2 | 12/2002 | Flores et al. ................ 385/135 |
| 6,539,160 B2 * | 3/2003 | Battey et al. ............... 385/135 |

* cited by examiner

*Primary Examiner*—Brian M. Healy
(74) *Attorney, Agent, or Firm*—Keith A. Roberson

(57) ABSTRACT

An installation closure having fiber management apparatus includes an outer shell and at least one cable centralizer disposed within the outer shell at a factory-assembled access location on a fiber optic distribution cable. The cable centralizer has a central channel for retaining the distribution cable and at least one routing slot for routing an optical fiber preterminated from the distribution cable at the access location. At least a portion of the outer shell is removed following deployment of the distribution cable and replaced with a conventional closure. An optical connector may be mounted upon the end of the preterminated optical fiber and the installation closure may further include an end centralizer having a central channel for retaining the distribution cable and at least one connector slot for retaining the connector. The replacement closure includes at least one connector port for receiving the connector from the inside of the installation closure.

16 Claims, 6 Drawing Sheets

INSTALLATION CLOSURE HAVING FIBER MANAGEMENT APPARATUS

BACKGROUND OF THE INVENTION

1. Field of the Invention

The present invention relates generally to enclosures deployed in fiber optic communications networks, and more particularly, to a factory-assembled installation closure having apparatus for routing, securing and protecting preterminated and/or connectorized optical fibers branched or withdrawn from a fiber optic distribution cable at a mid-span access location.

2. Technical Background

Optical fiber is increasingly being used for a variety of broadband applications including voice, video and data transmissions. As a result of the ever-increasing demand for broadband communications, fiber optic networks typically include a large number of mid-span access locations at which one or more optical fibers are branched or withdrawn from a distribution cable. These mid-span access locations provide multiple dedicated fiber drops to connect a plurality of subscribers to the network. Thus, mid-span access locations are used to extend an "all optical" communications network to commercial and residential subscribers. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the increase in the number of access points and the unique physical attributes of the optical fibers themselves, enclosures are needed for routing, securing and protecting optical fibers at the access points during and after installation of the distribution cable. Such enclosures are also needed for providing access to the preterminated and/or connectorized optical fibers, while at the same time providing protection for the access point from exposure to adverse environmental conditions. At the same time, however, these enclosures must not prevent the fiber optic distribution cable from being deployed through small diameter conduits or over conventional sheave wheels, rollers and pulleys.

In one example of a fiber optic communications network, one or more drop cables are interconnected with a distribution cable at a mid-span access location within an aerial splice closure suspended from an aerial strand or from the distribution cable itself. Substantial expertise and experience are required to configure the optical connections within the closure in the field. In particular, it is often difficult to enter the closure and to identify an optical fiber of the distribution cable to be interconnected with an optical fiber of a particular drop cable. Once identified, the optical fibers of the drop cables are typically joined directly to the optical fibers of the distribution cable at the mid-span access location using conventional splicing techniques, such as fusion splicing. In other instances, the optical fibers of the drop cables and the optical fibers of the distribution cable are first spliced to a short length of optical fiber having an optical connector mounted on the other end, referred to in the art as a "pigtail." These pigtails are then routed to opposite sides of a connector adapter sleeve located within the closure to interconnect the drop cable with the distribution cable. In either case, the process of entering and configuring the closure is not only time consuming, but frequently must be accomplished by a highly skilled field technician at significant cost and under field working conditions that are less than ideal. Reconfiguring optical fiber connections in an aerial splice closure is especially difficult, particularly in instances where at least some of the optical fibers of the distribution cable extend uninterrupted through the closure, since the closure cannot be readily removed from the distribution cable. Further, once the optical connections are made, it is often labor intensive, and therefore costly, to reconfigure the existing optical connections or to add additional optical connections.

In order to reduce costs by permitting less experienced and less skilled technicians to perform mid-span access optical connections and reconfigurations in the field, communications service providers are increasingly pre-engineering fiber optic networks and demanding factory-prepared interconnection solutions, commonly referred to as "plug-and-play" type systems.

In response, fiber optic hardware and equipment manufacturers have developed several approaches to overcome the disadvantages of accessing and splicing optical fibers in the field. In one such approach, drop cables are spliced to the distribution cable in the factory during manufacturing. While advantageous for manufacturing high quality access points in an environmentally controlled factory environment, disadvantages include the relatively large size (e.g., diameter) and inflexibility of the distribution cable assembly at the access points, as well as the incremental cost associated with dormant drop cables. Most importantly, factory-attached drop cables may not always be able to mitigate misplacement of the access location due to inaccurate pre-engineering measurements or installation errors since the drop cables are configured with predetermined lengths. As such, the current approaches do not completely address the communications service provider's need to reduce installation and deployment costs.

Accordingly communications service providers continue to desire low-profile, factory assembled "plug-and-play" closure solutions which can be installed and deployed using existing equipment and methods and which require a minimum amount of field labor for performing interconnections. It would be desirable to provide an installation closure assembly for routing, securing and protecting preterminated and connectorized optical fibers branched or withdrawn from a fiber optic distribution cable at a pre-engineered mid-span access location. It would also be desirable to provide a closure for an FTTx network that may be readily reconfigured after installation, such that drop cables may be quickly and easily interconnected at the access location. Further, it would be desirable to factory-assemble the closure on the distribution cable at the respective mid-span access locations with the lowest possible profile (i.e., outer diameter), while maintaining access to the optical fibers branched or withdrawn from the distribution cable.

SUMMARY OF THE INVENTION

The present invention provides an installation closure assembly for a mid-span access location positioned along a fiber optic distribution cable, wherein the installation closure includes fiber management apparatus for routing, securing and protecting preterminated and/or connectorized optical fibers branched or withdraw from the distribution cable.

In one aspect, an installation closure assembly is provided for protecting preterminated and/or connectorized optical fibers within a factory-assembled mid-span access location during transport and installation. The closure includes a removable outer shell and is provided with one or more centralizers operable for substantially centralizing a fiber optic distribution cable within the closure and routing, securing and protecting the optical fibers and their connectors. Predetermined portions of the closure are removed after installation and replaced with an appropriate assembly. Preferably, the assembly includes one or more connector ports containing receptacles for receiving optical connectors from the inside of the closure and for receiving connectors of drop cables from the outside of the closure. The entire assembly is low-profile, flexible and rugged so that it may be wound upon a cable reel and installed within a small diameter conduit system or pulled around conventional aerial installation equipment, such as sheave wheels, rollers and pulleys.

In another aspect, the invention is a factory-installed closure assembly that may be reconfigured in the field. Once reconfigured with a body defining connector ports, subsequent adding, removing or reconfiguring of drop cables may be performed from the outside of the closure without having to re-enter the closure and disturb the factory-installed components. The installation closure is preferably manufactured by performing a mid-span access location (including preterminating one or more optical fibers of the distribution cable), splicing a pigtail to each preterminated optical fiber, adding the cable centralizers, routing the optical fibers around the routing channels, retaining the connectors within a modified cable centralizer, covering the entire assembly with a material that defines a desired shape and overmolding the entire assembly to create a protective shell. Tapered end caps may be used to create a smooth transition between the distribution cable and the access location and may also protect the access location against pulling forces encountered during installation. The centralizers are positioned at various intervals along the length of the access location to provide strength and support. Preferably, the centralizers include substantially similar halves defining a central channel and a plurality of slots and grooves for managing the fibers. The fibers are routed out of the distribution cable at the access location and routed within the enclosure so as to not violate the minimum bend radius of the optical fibers.

In another aspect, the assembly includes a base and cover that are secured together and positioned around the mid-span access location by any conventional fastening means. The base and cover are interchangeable with additional components including an alternative base having at least one connector port. The assembly may be fitted with conical-shaped end caps for providing axial resistance to the assembly as well as slack storage for excess fiber length. Once installed, an outer protective shell, if present, and a portion of the base or cover is removed and replaced. Connectors are routed to their respective connector ports, and more preferably, to receptacles retained within the connector ports.

Additional features and advantages of the invention will be set forth in the detailed description which follows, and in part will be readily apparent to those skilled in the art from that description or recognized by practicing the invention as described herein, including the detailed description, the claims, and the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

DETAILED DESCRIPTION OF THE PREFERRED EMBODIMENTS

Figure 1:
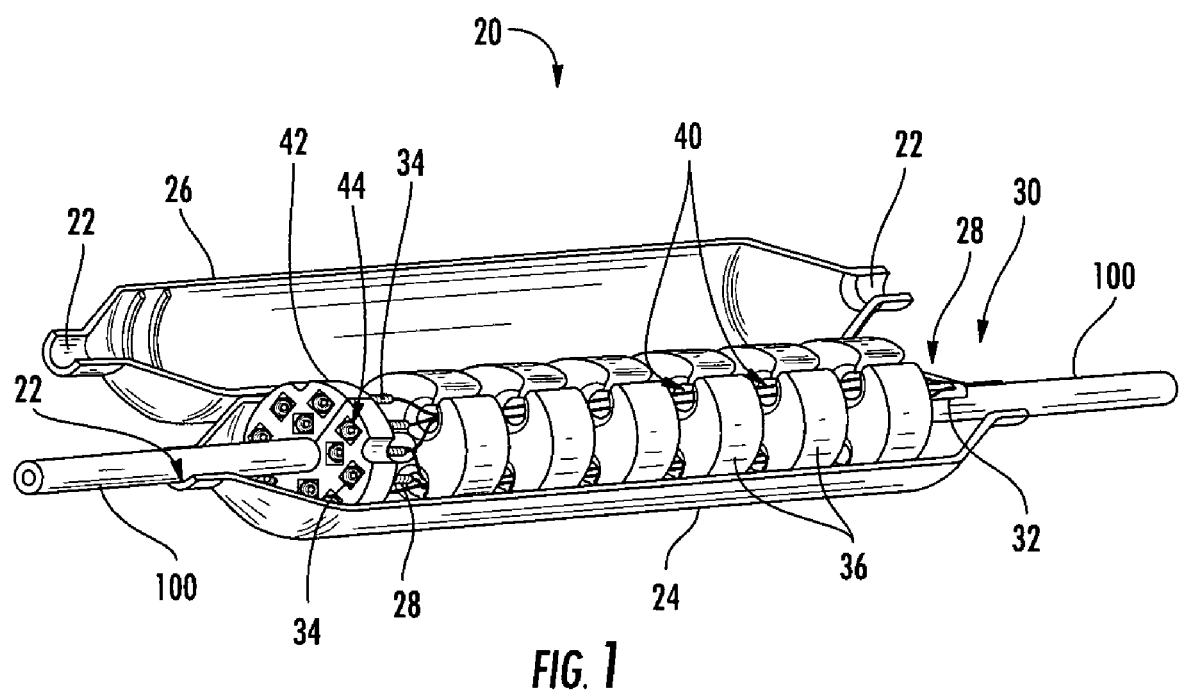
FIG. 1 is a perspective view of an installation closure having a fiber management apparatus according to the invention installed around a mid-span access location of a distribution cable, wherein a portion of the closure is removed purposes of clarity and the closure is shown in an opened configuration to expose the interior of the closure.

Reference will now be made in detail to preferred embodiments of the invention, examples of which are illustrated in the accompanying drawings. Whenever possible, the same reference numerals will be used throughout the drawings to refer to the same or like parts. An exemplary embodiment of an installation closure having a fiber management apparatus according to the invention is shown in FIG. 1 and is designated generally throughout this detailed description by reference number 20.

The installation closure 20 is operable for use with a preterminated and/or connectorized fiber optic distribution cable that includes at least one predetermined mid-span access location along the length of the cable for providing access to optical fibers branched or withdrawn from the distribution cable. In preferred embodiments, the distribution cable includes a plurality of access locations at spaced apart locations along the length of the distribution cable, thereby providing multiple mid-span access locations, or "tap points," for joining at least one pre-connectorized drop cable to the distribution cable in the field. The installation closure and its contents are used to route, secure and protect the preterminated and/or connectorized optical fibers during installation of the distribution cable and thereafter until the preterminated optical fibers are interconnected with connectorized drop cables. The entire assembly is low-profile and flexible so that it may be wound onto a cable reel for transport and deployment in aerial, direct-buried and buried installations, such as within a conduit or over conventional sheave wheels, rollers and pulleys. The installation closure is assembled to the cable in the factory, thus eliminating the need for first installing a fiber optic distribution cable and then performing a mid-span access, for example at a pole, pedestal or buried vault in the field. Once installed, all or a portion of the installation closure is removed and replaced with any desired closure type containing connector ports for receiving optical connectors, such as pre-connectorized drop cables in a "plug-and-play" style optical network.

Figure 2:
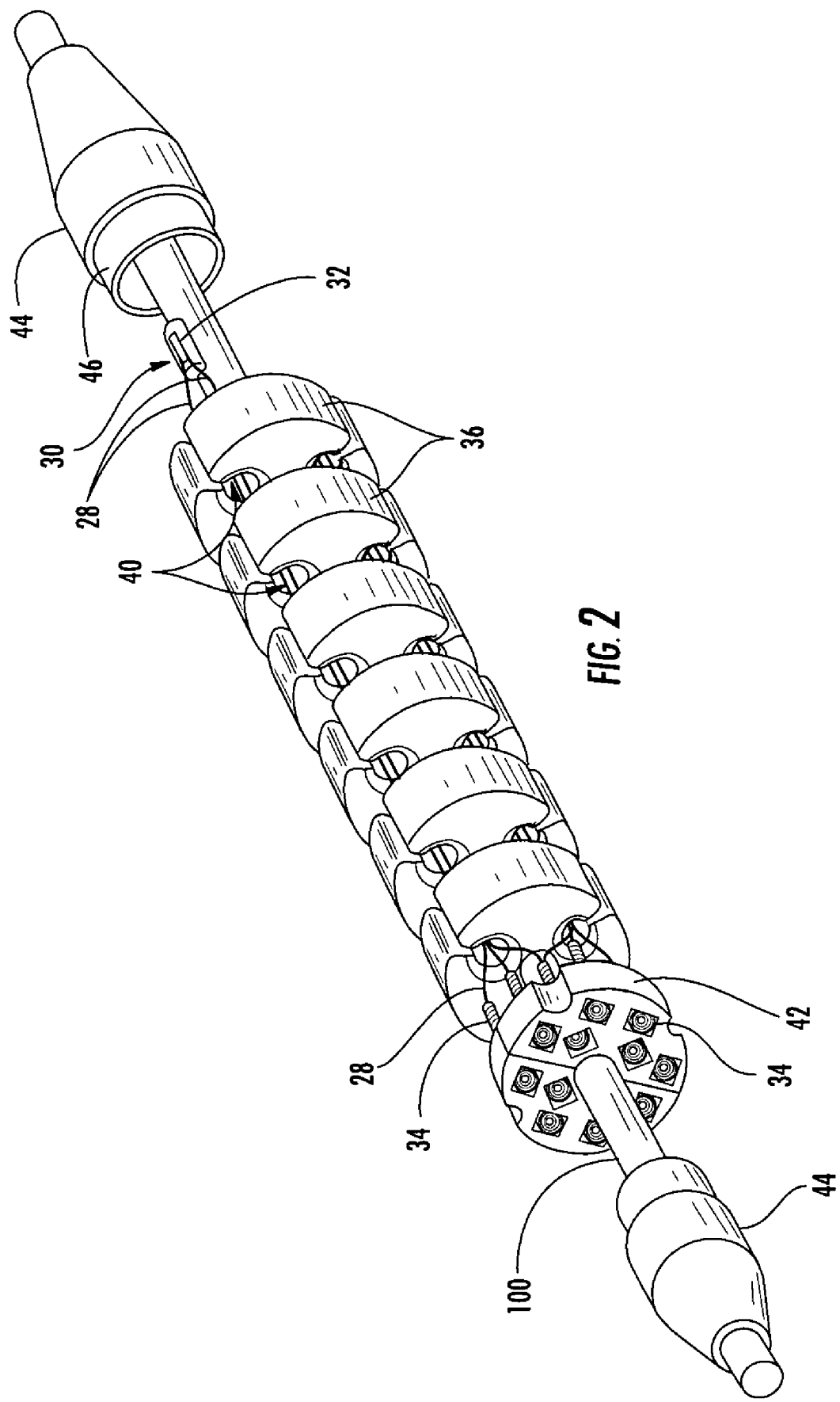
FIG. 2 is a perspective view of the fiber management apparatus of the installation closure of FIG. 1 showing a plurality of cable centralizers, a connector holder, a pair of end caps and managed optical fibers.

Referring now to the accompanying drawings, FIGS. 1-2 show a perspective view of the installation closure 20 having a fiber management apparatus constructed in accordance with an exemplary embodiment of the invention. A pre-connectorized distribution cable 100 passes through substantially the center of the closure 20, and enters and exits the closure assembly via cable openings 22 defined by two substantially symmetrical halves, referred to herein as the base 24 and the cover 26. As is known in the art, the distribution cable 100 includes a plurality of optical fibers protected by a cable sheath, among other components. The distribution cable 100 described herein may include any known fiber optic cable having any fiber count. One or more preterminated optical fibers 28 are branched or withdrawn from the distribution cable 100 at a predetermined exit point 30. In preferred embodiments, the preterminated optical fibers 28 are smoothly transitioned out of the exit point 30 through a flexible fiber transition piece 32. As shown, the transition piece 32 conforms to the curvature of a buffer tube or other structure to which it is attached. The transition piece 32 is positioned to surround the exit point 30 and protect the exposed open portion of the distribution cable 100. The preterminated optical fibers 28 may be positioned within protective tubes (e.g., 900 micron tubing) that are secured to the transition piece 32 by a suitable adhesive or epoxy. Alternatively, the optical fibers 28 may be routed out of the distribution cable 100 directly from the exit point 30 without the use of the transition piece 32. About 9 to 36 inches of optical fiber is withdrawn from the distribution cable 100 for each preterminated optical fiber 28 to be spliced to a pigtail. Alternatively, the preterminated optical fibers 28 may be direct connectorized to a suitable optical connector.

In preferred embodiments and in the exemplary embodiments shown herein, the preterminated optical fibers 28 are spliced, preferably by fusion splicing, to buffered or jacketed pigtails having a predetermined length in order to provide a total fiber length of about 20 to 36 inches, preferably about 25 inches. In this process, about a 10 to 20 inch length of optical fiber upon which an optical connector 34 has been previously mounted may be spliced in the factory to the length of preterminated optical fiber 28 withdrawn from the distribution cable 100. Splice points may be protected using conventional splice protectors or splice holders (not shown), which are operable for holding and protecting the junction between the end of the preterminated optical fiber 28 and the free end of the pigtail. Optical connector types may include, but are not limited to, SC, LC, FC, ST, SC/DC, MT-RJ, MTP and MPO style connectors. In the exemplary embodiments, single-fiber optical connector types are shown. However, multiple-fiber optical connector types may also be used as will be readily apparent to those of ordinary skill in the art.

Within the base 24 and cover 26, a plurality of cable centralizers 36 are positioned at various intervals along the length of the distribution cable 100 at the mid-span access location. The cable centralizers 36 are operable for substantially centering and retaining the distribution cable 100, as well as centering the cable assembly itself within the closure base 24 and cover 26 during transport and installation. As shown, the cable centralizers 36 include a two-piece design and are fastened together around the distribution cable 100 during the assembly process. However, the cable centralizers 36 may include a one-piece design and be threaded onto the distribution cable prior to assembly of the mid-span access location. The centralizers 36 are preferably formed of a hardened material to protect against crush forces. The centralizers 36 define a central channel (FIG. 4 at reference number 38) for receiving and retaining the distribution cable 100 and at least one, but preferably a plurality, of slots 40 for receiving and routing the preterminated optical fibers 28. The central channel 38 may be designed to accommodate a variety of distribution cable diameters. The distribution cable 100 remains retained within the central channel 38 of the cable centralizers 36 during transport and installation, and following installation if desired. Described in more detail with reference to FIG. 5, the closure assembly further includes a modified cable centralizer 42 at one end of the assembly for retaining the plurality of connectors 34. The modified cable centralizer (also referred to herein as the end centralizer 42) is likewise made of a hardened material and defines a plurality of connector slots 44 for receiving and retaining the connectors 34. The end centralizer 42 is also a two-piece design fastened together around the distribution cable 100, but likewise may be a one-piece design. The preterminated optical fibers 28 are routed through the plurality of cable centralizers 36 to the end centralizer 42, where the respective connectors 34 are secured in a desired position on the end centralizer.

Figure 6:
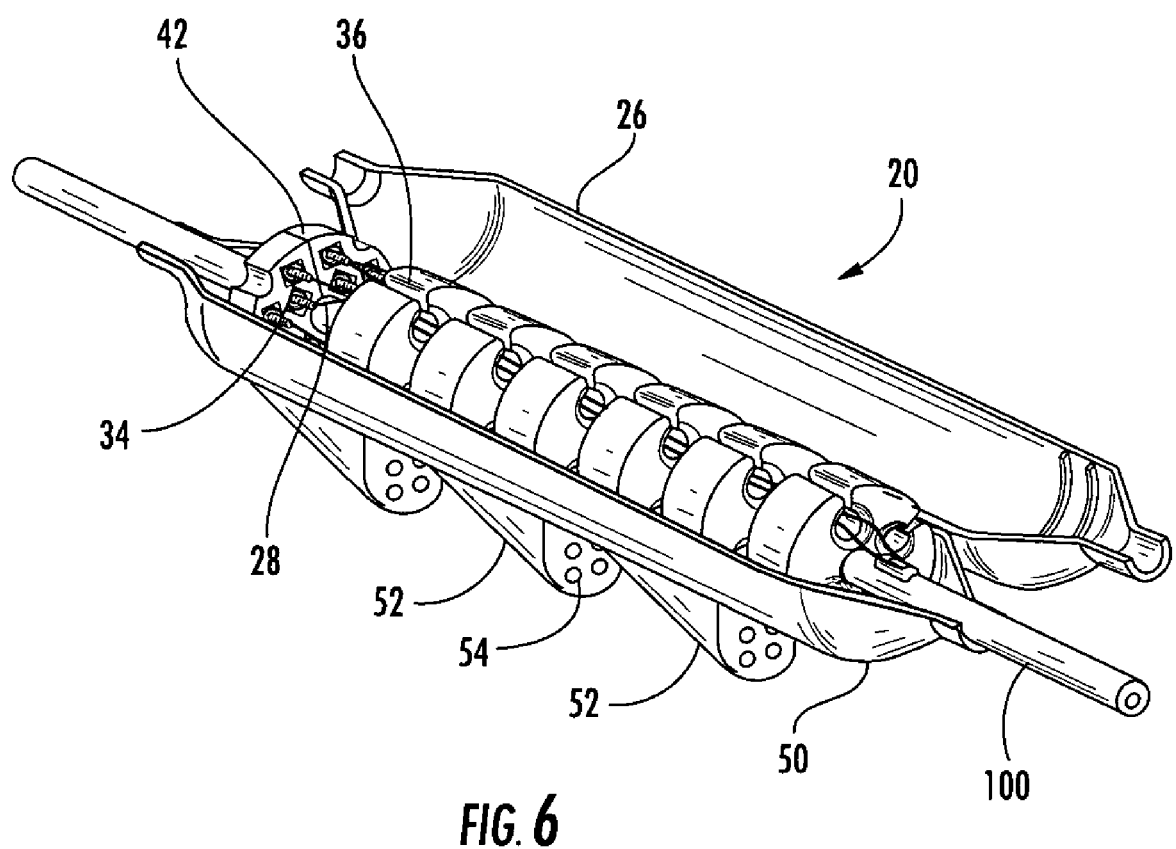
FIG. 6 is a perspective view of the installation closure shown with a portion of the cover removed and a field-added portion having a plurality of connector ports for receiving the connectors from the inside of the closure.

Together, the base 24 and cover 26, also referred to collectively herein as the closure shell 48, protect the access location and internal closure components. As such, the closure shell is preferably made of a material having a crush resistant property, such as a hard plastic, including PVC piping, composite or hard rubber. In the preferred embodiment, the outer shell 48 is created by a known injection molding or "overmolding" process in which a rugged yet flexible protective shell is injection molded around the assembly components. In an alternative embodiment, the outer shell is overmolded around the base 24 and cover 26 following assembly of the mid-span access location. The overmolded outer shell provides superior sealing properties as compared to conventional sealing methods utilizing elastomeric seals and gaskets. The overmolded outer shell provides protection to the access location, including the exposed portion of the distribution cable, the preterminated optical fibers 28 and other components of the closure assembly. In either configuration, the outer shell defines a lengthwise extending passageway and is of a length sufficient to house the entire access location and all components of the closure assembly. The outer shell, or at least a portion of the outer shell, is removed in the field after installation and replaced with a conventional field closure or an enclosure having a base and cover defining a plurality of connector ports. In the embodiment wherein the outer shell comprises the base 24 and the cover 26, the base 24 (or cover 26) may be removed in the field and replaced with a base (or cover) defining a plurality of connector ports. The connectors 34 are then routed to the connector ports in the replacement base (or cover) and the closure is sealed in a conventional manner. For example, a gasket may be positioned between the base 24 and the cover 26 to protect against adverse environmental elements, such as wind-driven rain. Such a closure assembly is illustrated in FIG. 6 and described in greater detail below wherein at least one of the base 24 (as shown) and the cover 26 are interchangeable with a replacement base or cover having at least one connector port 54.

Figure 3:
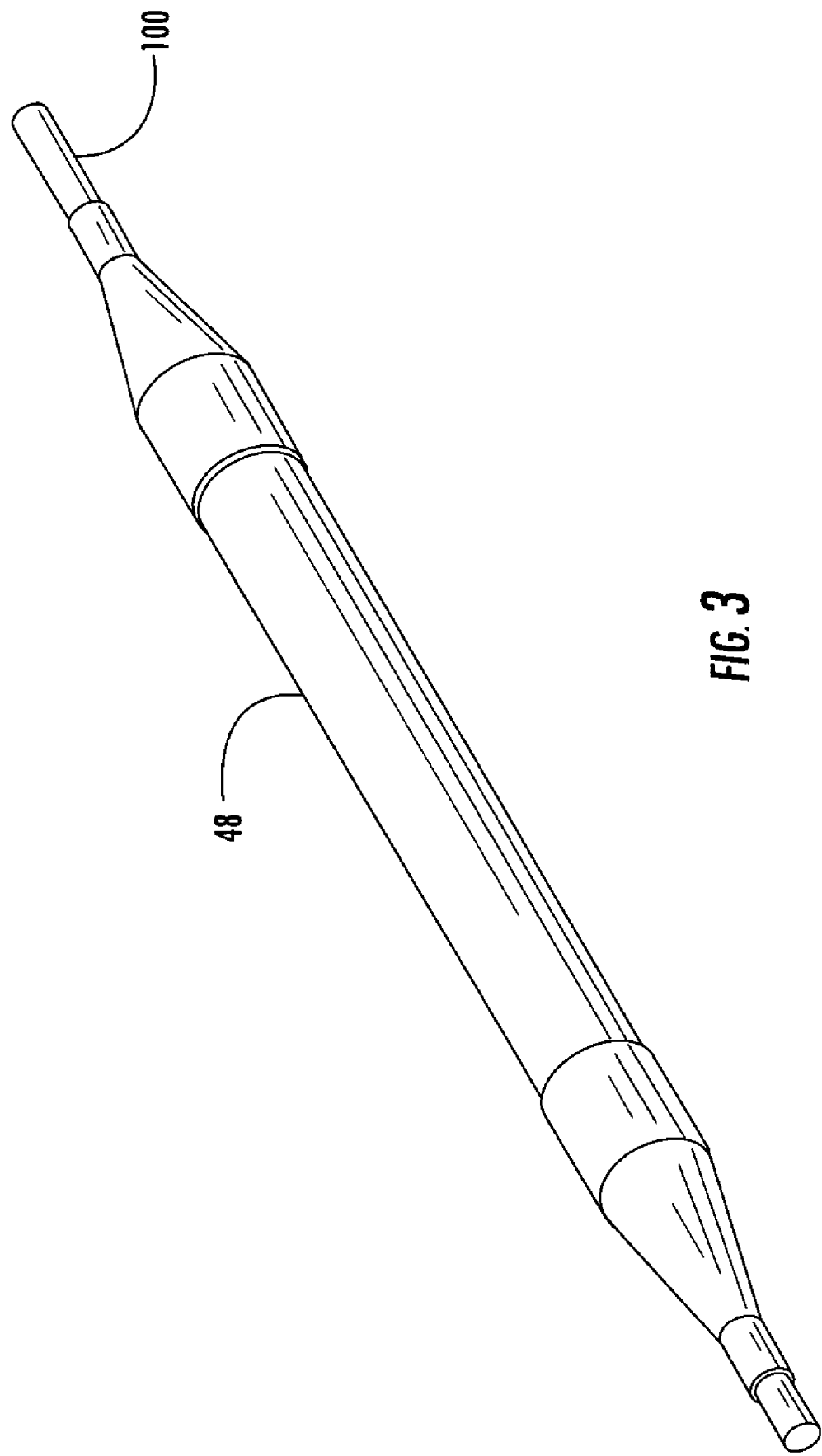
FIG. 3 is a perspective view of a fully-assembled installation closure including the fiber management apparatus.

Conical shaped end caps 44 may be positioned at each end of the access location and joined to the cable assembly. As shown, the end caps 44 are a two-piece component secured around the distribution cable 100 by a fastening mechanism, such as screws. However, the end caps 44 may be a one-piece design that is threaded onto the distribution cable prior to assembly of the access location. The end caps 44 define a shoulder 46 for receiving the crush-resistant outer shell, and in certain embodiments retaining the outer shell once installed. The end caps 44 are also operable for protecting the cable assembly at the access location by providing axial and torsional resistance to any pulling and twisting forces the cable assembly is exposed to. The end caps 44 may also provide slack storage for any excess fiber lengths disposed within the assembly. In an alternative embodiment, the end caps 44 may be molded (e.g., overmolded) directly with the outer shell, thereby forming a unitary protective unit. As shown in FIG. 3, heat shrinkable material or an overmold with at least one ripcord disposed underneath may be positioned over the outer shell and/or end caps 44 for added protection from adverse environmental effects.

Following deployment of the distribution cable 100 with the factory-assembled installation closure 20, a field technician may remove at least a portion of the outer shell and replace it with a replacement piece comprising connector ports containing factory-assembled receptacles. The field technician may then secure the connectors 34 within the receptacles, place the replacement base, cover or both in position and seal the field-assembled outer shell in a closed position. Preferably, all components of the closure assembly are designed such that they can be positioned at the access location on the distribution cable without having to thread the components along the length of the distribution cable. As such, the distribution cable can be assembled with a low profile (minimal outer diameter) and deployed over conventional sheave wheels, rollers and pulleys, and through conduits having an inner diameter of less than about 3 inches with the remaining components assembled onto the distribution cable following deployment.

Referring to FIG. 3, the installation closure having fiber management apparatus is shown fully-assembled and ready to be deployed. In one embodiment, the protective outer shell 48 is one piece and is overmolded with a suitable material operable for protecting the access location and preterminated or connectorized optical fibers during transport, deployment, any subsequent installation and until the access location is actually utilized. Ripcords (not shown), spaced about 180 degrees apart, may extend a suitable distance beyond the overmold at each end of the shell 48. The ripcords are operable for removing the overmold after cable deployment. Disposed immediately underneath the overmold is an overmold wrap (not shown) that provides a penetration barrier for the molding material. In a preferred embodiment, the overmold wrap may be positioned around the access location to provide a seal for all internal components disposed within the assembly. To overmold the access location, the factory-prepared closure assembly is clamped into a tool that defines cavities for receiving the molding material. The closure assembly is centered within the internal cavity of the tool. The tool comprises a plurality of injection ports for injecting the molding material. The molding material may include, but is not limited to, any polymeric material that may be injected in a liquid form and will set-up to form a substantially hardened protective shell, e.g., a two-part polyurethane or thermoplastic material. The molding material will flow into any void between the tool and the assembly. The molding material bonds to the overmold wrap and to about a 1 to 2 inch long section of the cable sheath at each end of the access location. The shell 48 is removed after cable deployment by pulling the ripcords through the overmold wrap and overmold, and separating the shell 48 from the internal components of the closure assembly.

Figure 4:
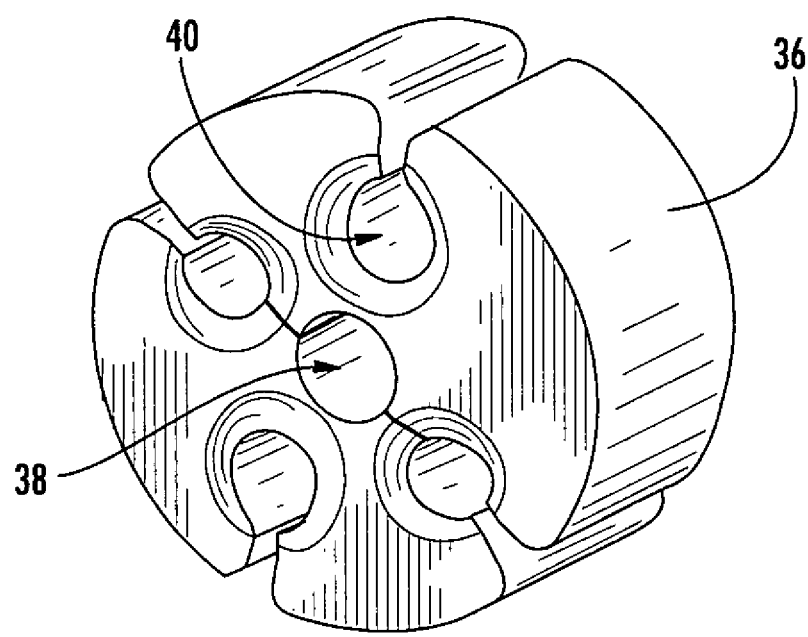
FIG. 4 is a perspective view of an exemplary one of the cable centralizers defining a central channel for receiving a distribution cable and a plurality of optical fiber routing slots.

Referring now to FIG. 4, a perspective view of a typical cable centralizer 36 is shown. In the exemplary embodiments shown and described herein, the cable centralizers 36 are secured around the distribution cable 100 by mating two substantially symmetrical halves together via a fastening feature (not shown) defined by each cable centralizer 36. In various examples, the fastening feature may comprise a lock-and-key feature, a screw, a snap-fit or a clip. Each cable centralizer 36 defines a central channel 38 for receiving and retaining the distribution cable 100. Each centralizer 36 further defines at least one, and preferably a plurality, of optical fiber routing slots 40 positioned around its outer periphery for routing the preterminated or connectorized optical fibers 28 along the length of the access location. The cable centralizers 36 are preferably formed of a plastic or metal material capable of providing adequate crush protection to the distribution cable and the branched or withdrawn optical fibers 28. Each centralizer 36 may optionally further define a groove around its outer diameter for receiving a resilient band or strap (not shown). The resilient band may be placed around the cable centralizer 36 after the optical fibers 28 have been routed through the corresponding routing slot 40 in order to maintain the optical fibers within the slot following assembly of the installation closure 20 and during any installation after deployment of the distribution cable 100.

Figure 5:
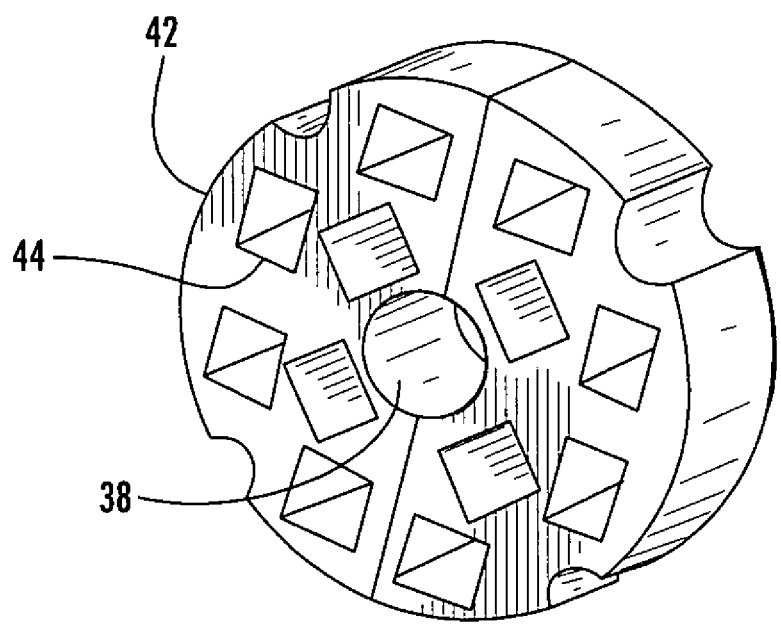
FIG. 5 is a perspective view of an exemplary modified cable centralizer that serves as a holder for retaining a plurality of connectors mounted upon the ends of the preterminated optical fibers.

Referring now to FIG. 5, a perspective view of the end centralizer 42 is shown. In the exemplary embodiments shown and described herein, the end centralizer 42 is secured around the distribution cable 100 by mating two substantially symmetrical halves together via a fastening feature (not shown). In various examples, the fastening feature may comprise a lock-and-key feature, a screw, a snap-fit or a clip. The end centralizer 42 defines a central channel 38 for receiving and retaining the distribution cable 100. The end centralizer 42 further defines at least one, and preferably a plurality, of connector slots 44 positioned around its outer periphery for retaining the connectors 34 mounted upon the ends of the preterminated optical fibers 28. The end centralizer 42 is typically formed of a plastic or metal material capable of providing adequate crush protection to the distribution cable 100 and the connectors 34.

Referring now to FIG. 6 and as stated above, a field technician may remove the base 24 provided with the factory-assembled installation closure 20 and replace it with a replacement base 50 in the field. The replacement base 50 may further comprise one or more connector ports 54 positioned through an exterior wall 52 of the base 50 for receiving corresponding ones of the plurality of connectors 34 mounted upon the ends of the preterminated optical fibers 28 from the inside of the closure assembly 20, and for receiving connectorized fiber optic drop cables from the outside of the closure assembly 20. Each connector port 54 may include a receptacle and alignment sleeve disposed therein or may be configured to receive the mating optical connectors in any suitable manner now known or hereafter devised. Regardless, each connector port 54 is the location at which an optical connection is made between a preterminated (and connectorized) optical fiber 28 of the distribution cable 100 and a respective optical fiber of a pre-connectorized drop cable. In all embodiments envisioned herein, the connector ports 54 are located within an exterior wall 52 of the closure, such as the bottom wall of the base of the installation closure or the top wall of the cover of the installation closure. The pre-connectorized drop cables may be readily connected to and disconnected from the connector ports 54 of the closure, thereby providing a plug-and-play optical network eliminating the need for entering the closure assembly 20.

The exemplary embodiment illustrated in FIG. 6 may be configured to accommodate any number of connector ports 54 in any arrangement. Thus, it is conceivable that the assembly may accommodate any number of pre-connectorized drop cables, for example, one, two, three, four, six, eight, twelve, etc. Preferably, the connector ports 54 further provide an environmental seal at the interface between the preterminated (and connectorized) optical fibers 28 and the pre-connectorized drop cables. Unused connector ports 54 may be sealed with a removable cap or plug (not shown) unless and until the particular connector port 54 is needed. The connector ports 54 are shown disposed within a bottom wall 52 of the replacement base 50. Furthermore, the connector ports 54 are shown positioned through the exterior wall on an angled surface defined by the base 50. The connector ports 54 are angled such that the pre-connectorized drop cables may be directed towards one end of the closure assembly 20, thus providing a low profile access location having improved access to install, remove and reconfigure the optical connections. In addition, the pre-connectorized drop cables are typically installed so as to provide a drip loop in a known manner to thereby direct moisture away from the optical connections. In aerial applications, the closure assembly 20 may be mounted upon the distribution cable 100 with the connector ports 54 directed towards the location where the other end of the drop cables will be installed, for example, a subscriber premises. In addition to being angled, the connector ports 54 may be recessed within the bottom wall 52, thus protecting the connector ports 54 and the connectorized ends of the drop cables from direct impact in the event that the closure is dropped or struck.

Figure 7:
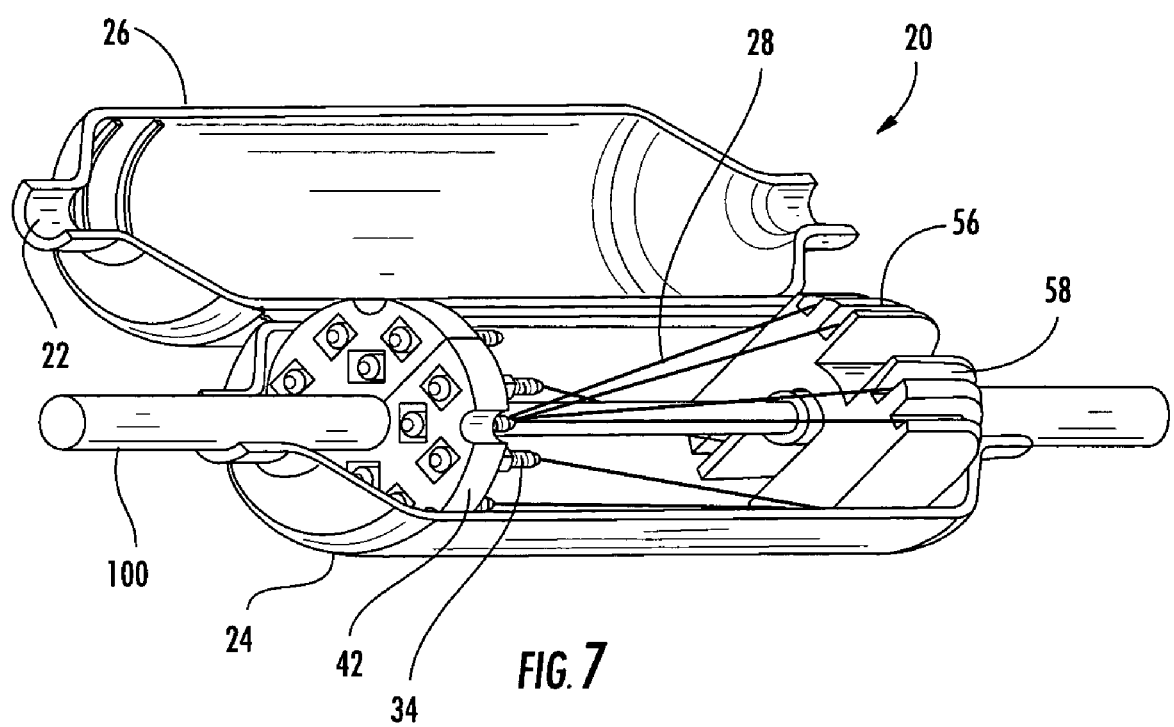
FIG. 7 is a perspective view of another embodiment of an installation closure having a fiber management apparatus according to the invention shown with a portion of the closure removed and the closure in an opened configuration to illustrate a modified cable centralizer at one end for retaining the connectors and a modified cable centralizer defining a plurality of channels for routing the optical fibers and reversing the direction of the optical fibers within the closure.

Referring now to FIG. 7, another exemplary embodiment of an installation closure 20 according to the invention is shown. The closure assembly 20 shown in FIG. 7 includes a fiber optic distribution cable 100 comprising a plurality of optical fibers 28 branched or withdrawn from the distribution cable 100 and connectorized with fiber optic connectors 34. The distribution cable 100 is positioned within the closure assembly 20 and substantially centered by an end centralizer 42 and a modified fiber routing centralizer 56. The routing centralizer 56 defines at least one, and preferably a plurality, of channels 58 for routing the optical fibers 28 about the periphery of the centralizer 56. Each centralizer 42, 56 may be positioned at a predetermined location within the closure assembly 20 along the length of the distribution cable 100 within the access location. As with the cable centralizers described with respect to the previous embodiments, the end centralizer 42 and routing centralizer 56 define a central channel for receiving, substantially centering and retaining the distribution cable 100 within the assembly. The routing centralizer 56 further provides for routing and protecting the optical fibers 28 as they reverse directions within the closure assembly 20. As shown, the centralizers 42, 56 comprise a two-piece design of generally similar halves such that a central channel for retaining the distribution cable 100 is defined. The location of the centralizers 42, 56 is preferably positioned at opposed ends of the closure. However, it will be understood by those skilled in the art that either or both of the components may be placed intermediate the ends of the closure. The optical fibers 28 are routed from an exit point (not shown) of the distribution cable 100 through and around the peripheral channels 58 of the routing centralizer 56 and in the reverse direction to the end centralizer 42.

Conical shaped end caps may be integrally molded at each end of the installation closure, or may be positioned at each end of the access location and joined to the closure. The end caps and closure are preferably secured around the distribution cable 100 and over the cable sheath by a fastening mechanism, such as screws, or the end caps and closure may be overmolded as previously described.

It will be apparent to those skilled in the art that various modifications can be made to the present invention without departing from the spirit and scope of the invention. Thus, it is intended that the present invention cover any and all possible embodiments of the invention that come within the scope of the appended claims and their equivalents.

What is claimed is:

1. An installation closure for a fiber optic cable having at least one access location along the length of the cable and comprising at least one preterminated optical fiber branched or withdrawn from the cable at the access location, the closure comprising:
   an outer shell; and
   one or more cable centralizers positioned within the outer shell and defining a channel for receiving the fiber optic cable and at least one slot for routing the at least one preterminated optical fiber;
   wherein at least a portion of the outer shell is removed following deployment of the fiber optic cable.

2. The installation closure according to claim 1, wherein at least one of the cable centralizers defines at least one slot for receiving and retaining a connector mounted upon the end of the at least one preterminated optical fiber.

3. The installation closure according to claim 1, wherein the outer shell comprises a base and a cover and wherein the base is removed following deployment of the fiber optic cable and replaced with a replacement base defining at least one connector port for receiving and retaining a connector mounted upon the end of the at least one preterminated optical fiber.

4. The installation closure according to claim 3, wherein the at least one connector port comprises a receptacle for receiving and retaining the connector.

5. The installation closure according to claim 4, wherein the at least one connector port receives and retains the connector from the inside of the installation closure and receives and retains a pre-connectorized drop cable from the outside of the installation closure.

6. The installation closure according to claim 1, further comprising a conical shaped end cap positioned around the fiber optic cable and secured to an end of the outer shell.

7. The installation closure according to claim 1, wherein the outer shell is sufficiently flexible to permit deployment of the fiber optic cable over conventional sheave wheels, rollers and pulleys and through a conduit system having an inner diameter less than about 3 inches.

8. The installation closure according to claim 1, wherein the outer shell is overmolded with an overmold material.

9. The installation closure according to claim 8, further comprising at least one ripcord disposed beneath the outer shell openable for removing the outer shell following deployment of the fiber optic cable to expose the interior components of the installation closure.

10. A fiber optic distribution cable comprising a plurality of optical fibers and having at least one access location along the length of the distribution cable for providing access to the plurality of optical fibers, the distribution cable comprising:

at least one preterminated optical fiber withdrawn from the distribution cable at the access location;

at least one cable centralizer defining a channel for receiving and retaining the distribution cable and at least one routine slot for receiving and routing the preterminated optical fiber;

at least one end centralizer defining a channel for receiving and retaining the distribution cable and at least one connecter slot for receiving an optical connector mounted upon the end of the preterminated optical fiber; and an outer shell encapsulating the distribution cable at the access location, wherein the outer shell comprises a base and a cover and wherein the base is removed following deployment of the distribution cable and replaced with a replacement base.

11. The distribution cable according to claim 10, wherein the replacement base has at least one connector port extending therethrough and wherein the optical connector is routed to the connector port from the inside of the outer shell.

12. The distribution cable according to claim 11, wherein a pre-connectorized drop cable is routed to the connector port from the outside of the outer shell, the connector port comprising a receptacle for retaining an optical fiber of the pre-connectorized drop cable in optical alignment with the preterminated optical fiber.

13. A fiber optic distribution cable comprising a plurality of optical fibers and having at least one access location along the length of the distribution cable for providing access to the plurality of optical fibers, the distribution cable comprising:

at least one preterminated optical fiber withdrawn from the distribution cable at the access location;

at least one cable centralizer defining a channel for receiving and retaining the distribution cable and at least one routing slot for receiving and routing the preterminated optical fiber;

at least one end centralizer defining a channel for receiving and retaining the distribution cable and at least one connecter slot for receiving an optical connector mounted upon the end of the preterminated optical fiber; and an outer shell encapsulating the distribution cable at the access location, wherein the distribution cable and the outer shell are sufficiently flexible to permit deployment of the distribution cable over conventional sheave wheels, rollers and pulleys and through a conduit system having an inner diameter less than about 3 inches.

14. A fiber optic communications network, comprising:

a fiber optic distribution cable comprising a plurality of optical fibers and having at least one mid-span access location along the length of the distribution cable for providing access to at least one preterminated optical fiber; and an installation closure comprising an outer shell and at least one cable centralizer for receiving and retaining the distribution cable and at least one routing slot for receiving and routing the preterminated optical fiber;

wherein at least a portion of the outer shell is removed following deployment of the distribution cable in the fiber optic communications network.

15. The fiber optic communications network of claim 14, further comprising an optical connector mounted upon the end of the preterminated optical fiber and an end centralizer defining a channel for receiving and retaining the distribution cable and at least one connector slot for receiving and retaining the connector.

16. The fiber optic communications network of claim 15, wherein the outer shell comprises a base and a cover and wherein the base is removed following deployment of the distribution cable and replaced with a replacement base having at least one connector port for receiving the connector from the inside of the installation closure and for receiving a pre-connectorized drop cable from the outside of the installation closure.

* * * * *